United States Patent [19]
Nakakubo et al.

[11] Patent Number: 5,833,220
[45] Date of Patent: Nov. 10, 1998

[54] HYDRAULIC TENSIONER

[75] Inventors: Katsuya Nakakubo; Hiroyuki Miyake; Toru Fujiwara, all of Saitama-ken, Japan

[73] Assignee: Tsubakimoto Chain Co., Osaka-fu, Japan

[21] Appl. No.: 763,527

[22] Filed: Dec. 12, 1996

[30] Foreign Application Priority Data

Dec. 14, 1995 [JP] Japan .................................. 7-325761

[51] Int. Cl.⁶ ........................................................ F16H 7/08
[52] U.S. Cl. ........................ 267/226; 188/266.2; 474/110
[58] Field of Search ................................. 267/221, 226, 267/64.11; 188/266.2, 266.5, 286, 322.18; 474/110, 135

[56] References Cited

U.S. PATENT DOCUMENTS

| | | | |
|---|---|---|---|
| 4,790,801 | 12/1988 | Schmidt et al. | 474/110 |
| 4,950,209 | 8/1990 | Kawashima et al. | 474/110 X |
| 5,383,813 | 1/1995 | Odai | 474/110 |
| 5,632,474 | 5/1997 | Hayakawa et al. | 474/110 X |

FOREIGN PATENT DOCUMENTS

| | | |
|---|---|---|
| 8710548 U | 2/1988 | Germany . |
| 4124500 | 1/1993 | Germany . |
| 3-239845 | 10/1991 | Japan . |
| 5-38442 | 5/1993 | Japan . |
| 5-321994 | 12/1993 | Japan . |
| 7-6552 | 1/1995 | Japan . |

*Primary Examiner*—Peter M. Poon
*Attorney, Agent, or Firm*—Dann, Dorfman, Herrell and Skillman; Henry H. Skillman

[57] ABSTRACT

A hydraulic tensioner which has a small number of components and hence can be reduced in size. The hydraulic tensioner includes a plunger 3 slidably fitted in a cylinder disposed in a tensioner body, a reservoir chamber formed in the tensioner body in a lower portion of the cylinder, a check valve permitting flow of an oil in a single direction from the reservoir chamber into the cylinder which is formed as a high pressure chamber, a low pressure chamber formed in the tensioner body exteriorly of the cylinder, an oil passage connecting a bottom of the low pressure chamber to a position between the check valve and the reservoir chamber, and a spring urging the plunger upwardly, wherein the low pressure chamber contains an air layer formed above a surface of the oil held in the lower pressure chamber. The oil passages and check valve enable the oil to flow into the high pressure chamber in a short time and hence efficiently dampen vibrations of the plunger.

4 Claims, 4 Drawing Sheets

HYDRAULIC TENSIONER

FIELD OF THE INVENTION

The present invention relates to a hydraulic tensioner used for applying an appropriate tension to a timing belt or a timing chain of a vehicle engine.

BACKGROUND OF THE INVENTION

A timing belt or a timing chain transmitting rotation between a crankshaft and a camshaft of a vehicle engine is generally used in combination with a hydraulic chain tensioner so as to control vibrations of the belt or chain and maintain a proper tension on the belt or chain while the belt or chain is running.

FIG. 3 shows one example of a conventional hydraulic tensioner which includes a tensioner body 30 having an internal hollow portion in which a plunger 31 is slidably disposed. The plunger 31 has a lower end portion fitted in a cylinder 32. The cylinder has a lower end to which is attached a check valve 33. The check valve 33 and a lower end of the plunger 31 define therebetween a space which forms a high pressure chamber.

The plunger 31 and the cylinder 32 have respective outer peripheral surfaces which form, jointly with an inner peripheral surface defining the hollow space of the tensioner body 30, an annular space. This space constitutes a low pressure chamber in which is received a spring 34 for urging the plunger 31 in a direction projecting from the tensioner body 30. The tensioner body 30 further has a reservoir chamber 36 formed at a lower part of the hollow portion with its lower end closed by a diaphragm 35. The reservoir chamber 36 is communicated with an underside of the check valve 33 and the low pressure chamber via a connecting hole.

The reservoir chamber 36 and the low pressure chamber are filled with an oil at all times. When the plunger 31 moves in the projecting direction, the check valve 33 admits the oil into the high pressure chamber. The plunger 31 has an outer end connected to a tensioner lever supporting a shoe so that the shoe is forced against a chain, not shown, by the force of the spring 34. When the plunger 31 is retracted against the force of the spring 34 by a shock impact applied from the chain side to the shoe, the hydraulic pressure in the high pressure chamber increases and thus closes the check valve 33. Thus, the oil in the high pressure chamber is forced to flow into the low pressure chamber through a very small gap or clearance between the outer peripheral surface of the plunger 31 and an inner peripheral surface of the cylinder 32. The oil, as it passes through the clearance, encounters a great flow resistance by means of which the shock impact applied from the chain to the shoe is dampened. When the plunger 31 moves in the direction projecting from the tensioner body 30 by the force of the spring 34, the oil in the reservoir chamber 36 is permitted to flow into the high pressure chamber through the check valve 33. In this instance, the diaphragm 35 distorts or deflects toward the interior side of the reservoir chamber 36 so as to follow a reduction in quantity of the oil held in the reservoir chamber 36. Thus, the capacity or content volume of the reservoir chamber 36 can be varied in such a manner as to follow an actual quantity of the oil received in the reservoir chamber 36.

FIG. 4 illustrates another example of the conventional hydraulic tensioner, such as disclosed in Japanese Patent Laid-open Publication No. HEI 5-321994. The illustrated hydraulic tensioner includes a hollow plunger 44 slidably received in a cylinder 41, there being defined between the interior of the plunger 40 and the bottom of the cylinder 41 a pressure chamber 42 in which a spring 43 is received. The cylinder 41 is mounted in a hollow shell 48 having a seal 49 slidably receiving the outer ring of the plunger 40. The tensioner further has a first reservoir 44 provided above the pressure chamber 42, and a second reservoir 46 provided below the pressure chamber 42 with a check valve 45 disposed between the chamber 42 and the reservoir 46. The first reservoir 44 and the pressure chamber 42 communicate with each other via a very small gap or clearance between an outer peripheral surface of the plunger 40 and an inner peripheral surface of the cylinder 41. The first reservoir 44 and the second reservoir 46 communicate with each other via connecting passages 47 between the outer surface of the cylinder 41 and the shell 48.

With the hydraulic tensioner thus constructed, when the plunger 40 is subjected to a load applied from above, the oil in the pressure chamber 42 is expelled through the very small clearance to the first reservoir 44. When the downward load decreases due to the start of an engine, for example, the plunger 40 is displaced upwardly by the force of the spring 43. In this instance, the check valve 45 admits the oil from the second reservoir 46 into the pressure chamber 42, and the second reservoir 46 is replenished with the oil supplied from the first reservoir 44 via the connecting passages 47. Under the seal 49, the first reservoir 44 has an air space or layer formed above a surface of the oil held in the same reservoir 44. With the air layer thus provided, changes in content volume of the oil-reserving space caused due to movement of the plunger or changes in oil temperature can be taken up.

The conventional hydraulic tensioner shown in FIG. 3 has a problem that since the content volume of the reservoir chamber is changed by the diaphragm according to changes in quantity of the oil in the reservoir chamber, the tensioner body must provide a space or room for displacement of the diaphragm, increasing the overall length of the tensioner body. In addition, the diaphragm and parts used setting the diaphragm in the tensioner body increase the number of components of the tensioner.

According to the conventional hydraulic tensioner of the construction shown in FIG. 4 and described in Japanese Patent Laid-open Publication No. HEI 5-321994, a sudden movement of the plunger in the direction projecting from the tensioner body causes the check valve open, allowing the oil to flow from the second reservoir into the pressure chamber. In this instance, since the second reservoir is smaller in capacity than the pressure chamber, the oil in the first reservoir flows through the narrow connecting passages into the second reservoir to replenish the quantity of oil flown into the pressure chamber.

However, when the temperature of the oil is low, the viscosity of the oil is high. Accordingly, the oil, as it passes through the connecting passages, encounters a great flow resistance and hence takes a long time to replenish the second reservoir during which time the plunger tends to vibrate with large amplitudes due to an insufficient hydraulic pressure build-up in the pressure chamber. In addition, since the plunger has an internal space for receiving therein the spring, if the air held in the first reservoir above the oil enters the pressure chamber, the air is collected in the internal space of the plunger above the oil, lowering the vibration dampening effect of the tensioner.

SUMMARY OF THE INVENTION

It is accordingly an object of the present invention to overcome the foregoing problems of the prior art and provide a hydraulic tensioner which has a small number of components and hence can offer a reduction in size, enables the oil to flow into the high pressure chamber side in a short time and hence is able to efficiently reduce vibrations of the plunger.

To attain the foregoing object, a hydraulic tensioner of this invention comprises: a plunger slidably fitted in a cylinder disposed vertically in a tensioner body, with an upper portion of the plunger projecting outwardly from the tensioner body to apply tension to a chain; a reservoir chamber formed in the tensioner body at a lower portion of the cylinder; a check valve disposed at a lower end of the cylinder for permitting flow of an oil in a single direction from the reservoir chamber into the cylinder, the cylinder forming a high pressure chamber; a low pressure chamber formed in the tensioner body exteriorly of the cylinder; an oil passage connecting a bottom of the low pressure chamber to a position between the check valve and the reservoir chamber; and a spring disposed in the low pressure chamber and urging said plunger upwardly, wherein the reservoir chamber and the low pressure chamber hold therein an oil to be supplied through the check valve to the high pressure chamber, with an air layer formed above a surface of the oil held in the lower pressure chamber. It is preferable that the high pressure chamber has a content volume smaller than that of the low pressure chamber.

When the plunger is depressed by an impact force applied to an upper end of the plunger, the hydraulic pressure in the high pressure chamber increases and thus closes the check valve whereby the oil is prevented from flowing out from the high pressure chamber. The oil trapped in the high pressure chamber is forced out to the low pressure chamber through a very small gap or clearance between an outer peripheral surface of the plunger and an inner peripheral surface of the cylinder. In this instance, the oil due to its viscosity encounters a flow resistance by means of which the impact force is dampened, and vibration of the plunger caused by the impact force is attenuated or dampened rapidly.

When the chain instantaneously becomes loose, at an engine start-up condition for example, the plunger is thrust up by the spring. In this instance, due to a pressure drop built up in the high pressure chamber, the high pressure chamber admits the oil flowing from the reservoir chamber via the check valve. At the same time, the reservoir chamber is replenished with oil flowing thereinto from the bottom of the low pressure chamber via the connecting passage. Since the connecting passage is very short, the oil as it passes through the connecting passage encounters only a small flow resistance. Thus, the oil-replenishment can be achieved momentarily. In addition, the air layer, which is formed above the oil held in the low pressure chamber, takes up changes in content volume of the oil-holding space caused by the movement of the plunger, and changes in volume of the oil caused due to changes in temperature of the oil.

In the case where the capacity or content volume of the high pressure chamber is smaller than that of the reservoir chamber, a quantity of oil to be replenished from the low pressure side through the connecting passage can be reduced. Consequently, the oil can flow into the high pressure chamber in immediate response to the upward movement of the plunger.

BRIEF DESCRIPTION OF THE DRAWINGS

All of the objects of the present invention are more fully set forth hereinafter with reference to the accompanying drawings, wherein.

DETAILED DESCRIPTION OF THE PREFERRED EMBODIMENTS

Figure 1:
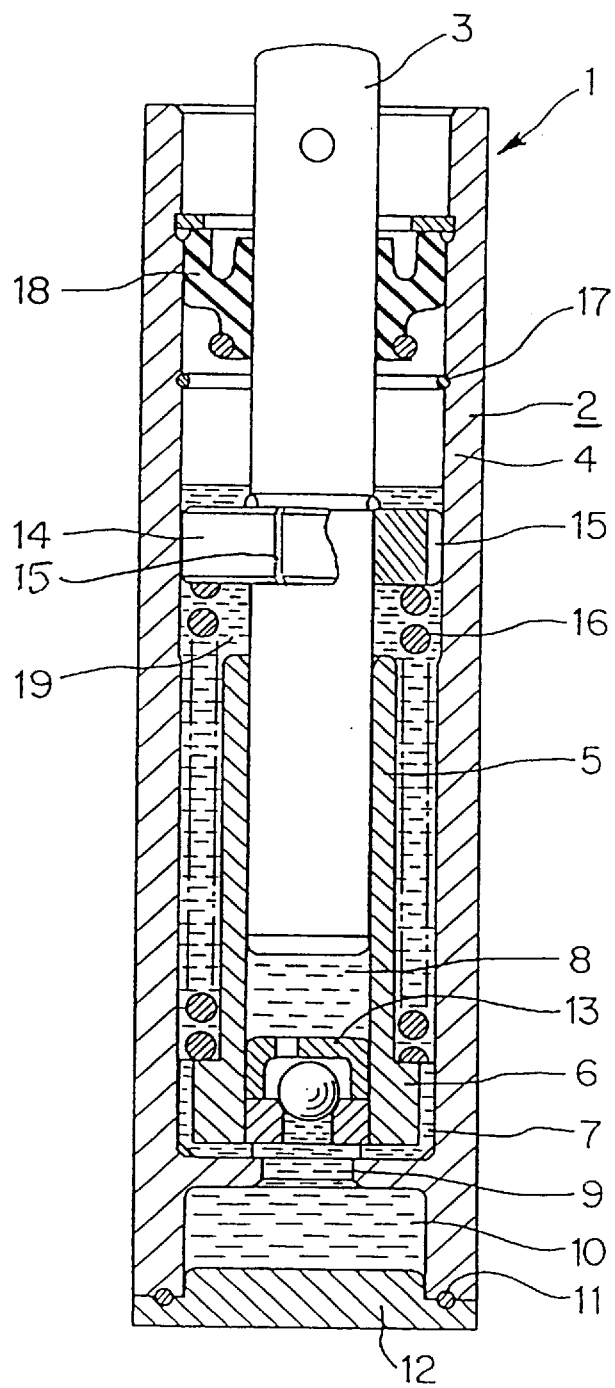
FIG. 1 is a cross-sectional view showing one embodiment of a hydraulic tensioner according to the present invention.

Embodiments of the present invention will be described hereinafter with reference to the drawings. In FIG. 1, one embodiment of a hydraulic tensioner 1 has a chain-tensioner body 2 attached to a mount member near a chain or a timing belt (not shown) in an engine compartment, and a plunger 3 urged to project upwardly from the tensioner body 2. The plunger 3 has an upper end connected to a tension arm (not shown) to which is attached a roller forced against the timing belt, or a shoe forced against the chain.

The tensioner body 2 has an internal cylindrical hollow shell 4 closed at its lower end and open at an upper end, and a cylinder 5 vertically disposed in the hollow shell 4. The cylinder 5 has at its lower end an annular flange 6 having an enlarged diameter so that the flange 6 is fitted with an inner peripheral surface of a bottom portion of the hollow shell 4. The flange 6 has a plurality of continuous connecting grooves 7 formed in an outer peripheral surface and a bottom surface of the flange 6 to provide oil passages.

The tensioner body 2 has a through-hole 9 formed at a central portion of the bottom wall of the hollow shell 4, and a reservoir chamber 10 defined below the through-hole 9. The reservoir chamber 10 is closed at its lower end by a plug 12 mounted in the lower end of the tensioner body 2 with an O-ring 11 disposed therebetween to seal the reservoir chamber 10.

A check valve 13 using a ball is mounted in a lower end of the cylinder 5. The plunger 3 has a lower portion slidably fitted in the cylinder 5. The cylinder 5 has a high pressure chamber 8 defined between a lower end of the plunger 3 and the check valve 13. The check valve 13 has a lower end confronting the through-hole 9, with the connecting grooves 7 interconnecting the check valve 13 and the through-hole 9.

The plunger 3 has an upper part extending from an upper end of the cylinder 5, and a spring retainer 14 mounted on an intermediate portion of the upper part of the plunger 3. The spring retainer 14 has an outer peripheral surface slidably fitted with an inner peripheral surface of the hollow shell 4 to guide the plunger 3 as the plunger 3 moves vertically. The outer peripheral surface of the spring retainer 14 has a plurality of vertical oil grooves 15 for the passage therethrough of an oil.

A spring 16 is disposed between a lower surface of the spring retainer 14 and an upper surface of the flange 6 of the cylinder 5. The spring 16 urges the plunger 3 upwardly via the spring retainer 14. The spring retainer 14 is limited in its upward movement by a stop ring 17 resiliently fitted in a circumferential groove in the inner peripheral surface of the hollow shell 4. Thus, removal of the plunger 3 from the hollow shell 4 in the upward direction is prevented by the stop ring 17.

An oil seal 18 made of rubber is fitted in the hollow portion above the stop ring 17 to provide a hermetic seal between the outer peripheral surface of the plunger 3 and the inner peripheral surface of the hollow shell 4. The inner peripheral surface of the hollow shell 4 thus sealed by the oil seal 18, the respective outer peripheral surfaces of the plunger 3 and cylinder 5, and the upper surface of the flange 6 jointly define an annular space forming a low pressure chamber 19.

With the construction described above, the reservoir chamber 10 and the low pressure chamber 19 both hold an oil. The oil is also introduced into the high pressure chamber 8 via the check valve 13. An air layer is formed between a surface of the oil held in the low pressure chamber 19 and the oil seal 18 to take up or absorb changes in capacity or content volume of the oil-holding space caused by the movement of the plunger 3, and changes in volume of the oil caused by changes in the temperature of the oil.

The hydraulic pressure in the high pressure chamber 8 rises when a shock impact force is applied to the upper end of the plunger 3. In this instance, since the check valve 13 blocks the oil from flowing out from the high pressure chamber 8, the oil in the high pressure chamber 8 is expelled to the low pressure chamber 19 side through a very small gap or clearance between the outer peripheral surface of the plunger 3 and the inner peripheral surface of the cylinder 5. The oil due to its viscosity encounters a flow resistance by means of which the impact force is dampened and vibration of the plunger 3 is reduced or dampened immediately.

In an engine starting condition, for example, the timing belt or the chain temporarily becomes loose and, hence, the plunger 3 is thrust upwardly by the force of the spring 16. In this instance, due to a hydraulic pressure drop built up in the high pressure chamber 8, the oil flows from the reservoir chamber 10 into the high pressure chamber 8 via the check valve 13 so as to follow-up a change in capacity of content volume of the high pressure chamber 8. At the same time, the oil stored in the low pressure chamber 19 is supplied through the flange 6 from the bottom of the low pressure chamber to the reservoir chamber 10 via the connecting grooves 7. In this instance, since the connecting grooves 7 are short and hence create a small flow resistance when the oil passes through the connecting grooves 7. Thus, the reservoir chamber 10 is replenished in a very short time.

Although the connecting grooves 7 in this embodiment are formed in the flange 6 of the cylinder 5, they may be formed in the inner peripheral surface of the hollow shell 4 of the tensioner body 2, and in the bottom wall of the hollow shell 4 around the through-hole 9. As an alternative, the connecting grooves 7 may be formed in both of the tensioner body 2 and the cylinder 5.

Figure 2:
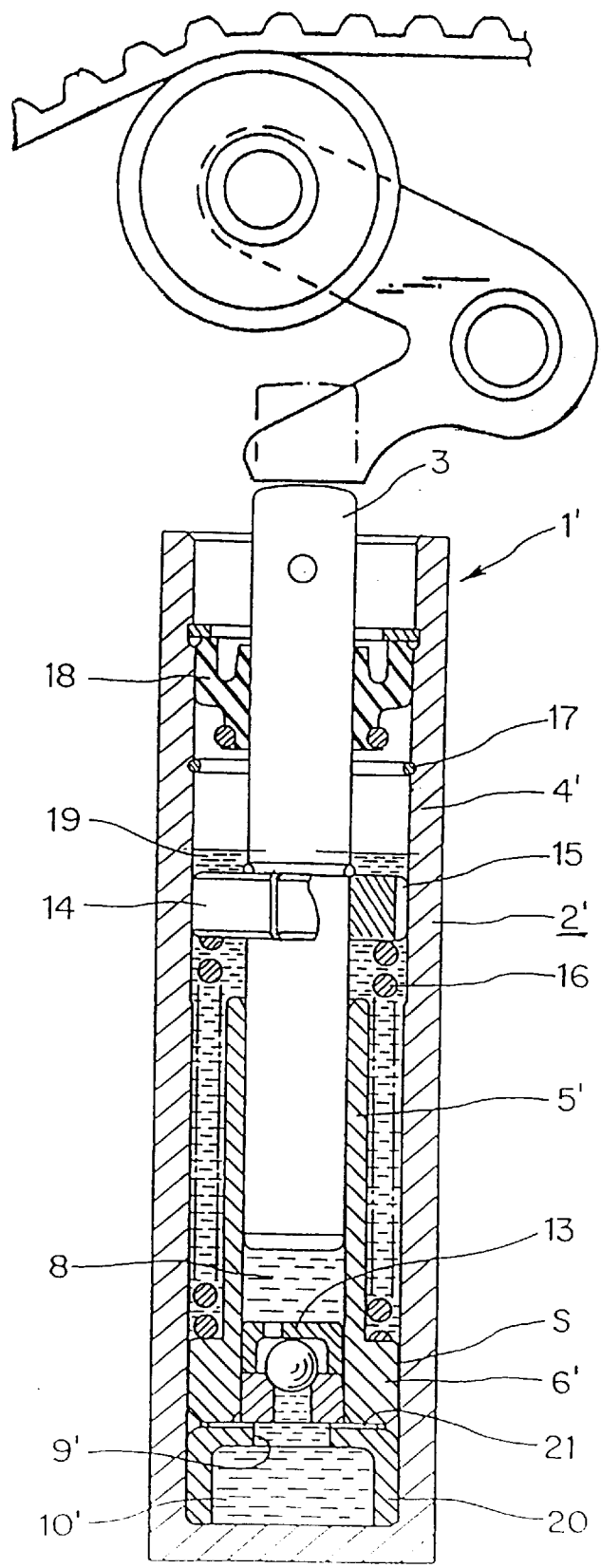
FIG. 2 is a cross-sectional view showing another embodiment of the hydraulic tensioner according to the present invention.
Figure 3:
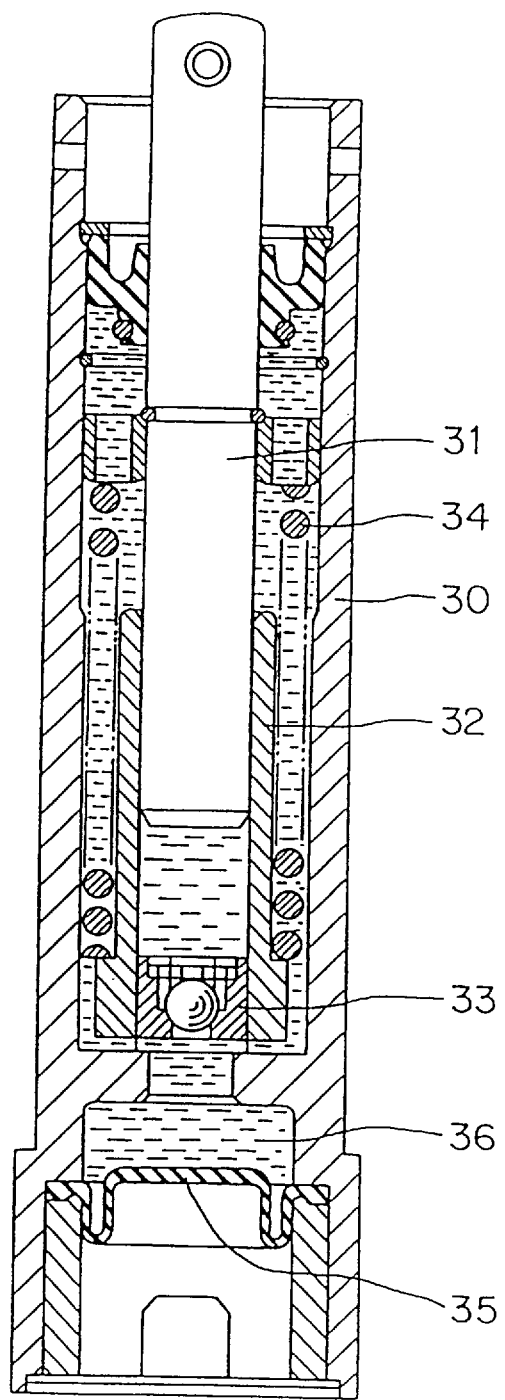
FIG. 3 is a cross-sectional view showing one embodiment of a conventional hydraulic tensioner.
Figure 4:
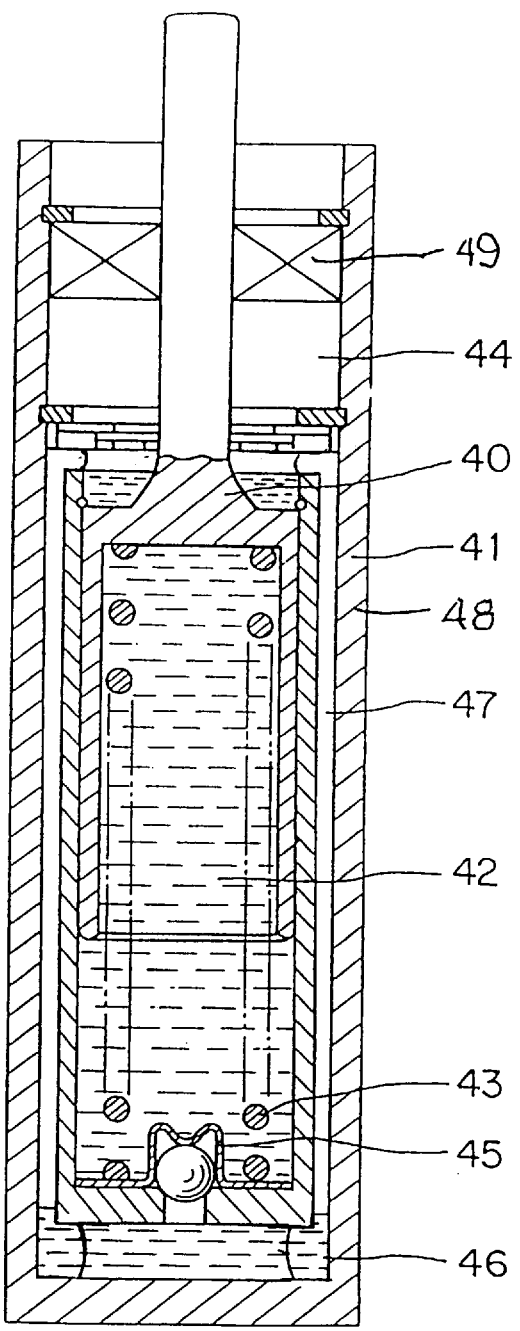
FIG. 4 is a cross-sectional view showing another example of the conventional hydraulic tensioner.

FIG. 2 is a cross-sectional view showing another embodiment of the hydraulic tensioner according to the present invention, in which the parts designated by the like or corresponding reference numerals as those shown in FIG. 1 are the same in construction as those described above with respect to the first embodiment. In the hydraulic tensioner 1' of this embodiment, a tensioner body 2' has a hollow shell 4' extending to a lower end of the tensioner body 2' and has a bottom surface, and there is no independent reservoir chamber as in the embodiment previously described. According to this embodiment, an inverted cup-shaped spacer 20 having a through-hole 9' formed in an upper wall thereof is disposed at the bottom of the hollow shell 4' so that an internal space of the cup-shaped spacer 20 closed by the bottom wall of the hollow portion 4' forms a reservoir chamber 10'.

The spacer 20 abuts a lower surface of the flange 6' of a cylinder 5'. An outer peripheral surface and the lower surface of the flange 6' are devoid of connecting grooves as in the first embodiment previously described. The oil flows through a very small gap or clearance S between the outer peripheral surface of the flange 6' and an inner peripheral surface of the hollow portion 4'. The upper surface of the spacer 20 has a plurality of radial connecting grooves 21 interconnecting an outer peripheral edge portion of the spacer 20 and the through hole 9' of the spacer 20. The clearance S and the grooves 21 jointly form oil passages.

As described above, according to the hydraulic tensioner of the present invention, the reservoir chamber has no diaphragm at its bottom end and hence can reduce the overall length of the tensioner body. This contributes to the reduction in size and number of components of the hydraulic tensioner.

In an engine start-up condition, the plunger may suddenly project with a long stroke by the force of the spring. In this instance, the oil flows from the reservoir chamber into the high pressure chamber. If the quantity of oil held in the reservoir chamber is insufficient to fill the high pressure chamber, the oil held in the low pressure chamber is immediately supplied through oil passages which afford communication between the bottom of the low pressure chamber and the check valve and the reservoir chamber. Since the oil passages are very small in length and hence create only a very small flow resistance, the reservoir chamber is immediately replenished with the oil. Thus, vibration of the plunger and the resulting vibration of the timing belt or the chain can be attenuated.

Since the spring is disposed outside the cylinder, and since the plunger has no recessed portion open downward to receive therein the spring, air bubbles coming from the air layer at an upper portion of the low pressure chamber into the high pressure chamber are immediately forced upwardly through the clearance between the outer peripheral surface of the plunger and the inner peripheral surface of the cylinder and then are discharged to the outside of the tensioner. Thus, the air bubbles have no adverse effect on the function of the tensioner.

In the case where the high pressure chamber is smaller in capacity or content volume that the reservoir chamber, the quantity of oil to be replenished supplied from the low pressure chamber side through the connecting passages can be reduced. Accordingly, in immediate response to the movement of the plunger in the projecting direction, the oil flows into the high pressure chamber, thereby improving the vibration dampening effect on the timing belt or the chain.

While particular embodiments of the invention have been herein illustrated and described, it is not intended to limit the invention to such disclosures, but changes and modifications may be made therein and thereto within the scope of the following claims.

We claims:

1. A hydraulic tensioner having a body with fixed side walls and comprising:

a cylinder disposed vertically in said tensioner body within said side walls;

a plunger slidably fitted in said cylinder with an upper portion of said plunger projecting outwardly from said tensioner body;

a reservoir chamber formed in said tensioner body at a lower portion of said cylinder, said reservoir comprising a hollow chamber concentric with said cylinder and having at the bottom a fixed bottom wall;

a check valve disposed at a lower end of said cylinder for permitting flow of an oil in a single direction from said reservoir chamber into said cylinder, said cylinder forming a chamber normally having a high pressure;

a low pressure chamber formed in said tensioner body exteriorly of said cylinder;

an oil passage connecting a bottom of said low pressure chamber to a position between said check valve and said reservoir chamber;

a spring disposed in said low pressure chamber and urging said plunger upwardly;

said reservoir chamber and said low pressure chamber providing a non-expandable space to hold therein the oil to be supplied through said check valve to said high pressure chamber, with an air layer formed above a surface of the oil held in said non-expandable space, and a seal secured to said tensioner body to close the top of said low pressure chamber and contain any air in said layer within said non-expandable space at the top, said layer being expandable and retractable to accommodate transfer of oil between said high pressure chamber and said non-expandable space.

2. A hydraulic tensioner according to claim 1, wherein said high pressure chamber has a content volume smaller than that of said low pressure chamber.

3. A hydraulic tensioner having a body with fixed side walls adapted to be mounted adjacent a chain or belt comprising:

a hollow cylinder disposed vertically in said tensioner body within said side walls, a plunger slidably fitted in said cylinder and having an upper portion projecting outwardly from said tensioner body and adapted to mount a shoe or roller engaging said chain or belt, said plunger forming a chamber normally having a high pressure in said cylinder below said plunger;

a reservoir chamber formed in said tensioner body adjacent the lower end of said high pressure chamber of said cylinder, said reservoir comprising a hollow chamber concentric with said cylinder and having at the bottom a fixed bottom wall;

a check valve disposed at a lower end of said cylinder communicating with said reservoir chamber and said high pressure chamber of the cylinder for permitting flow of an oil in one direction from said reservoir chamber into said high pressure chamber, a low pressure chamber formed in said tensioner body exteriorly of said cylinder;

an oil passage connecting said low pressure chamber to said check valve and said reservoir chamber;

a spring disposed in said low pressure chamber and urging said plunger upwardly, wherein said reservoir chamber and said low pressure chamber providing a non-expandable space to hold therein the oil to be supplied through said check valve to said high pressure chamber, with an air layer formed above a surface of the oil held in said non-expandable space, and a seal secured to said tensioner body to close the top of said low pressure chamber and contain any air in said layer within said non-expandable space at the top, said layer being expandable and retractable to accommodate transfer of oil between said high pressure chamber and said non-expandable space.

4. A hydraulic tensioner according to claim 3, wherein said high pressure chamber communicates with said low pressure chamber through a limited clearance between the plunger and cylinder, said limited clearance affording limited flow in a direction opposite that through the check valve out of said high pressure chamber into said low pressure chamber.

* * * * *

UNITED STATES PATENT AND TRADEMARK OFFICE
CERTIFICATE OF CORRECTION

PATENT NO. : 5,833,220
DATED : November 10, 1998
INVENTOR(S) : Katsuya Nakakubo et al.

It is certified that error appears in the above-identified patent and that said Letters Patent is hereby corrected as shown below:

Column 1, line 39, after "shoe" insert --(like the lever and roller shoe shown in Fig. 2)--.

Signed and Sealed this

Sixteenth Day of March, 1999

Attest:

Q. TODD DICKINSON

Attesting Officer

Acting Commissioner of Patents and Trademarks